United States Patent Office 2,859,200
Patented Nov. 4, 1958

2,859,200

ROOM TEMPERATURE SETTING ADHESIVE

Risto P. Lappala, Madison, Wis., assignor to Bjorksten Research Laboratories, Inc., Madison, Wis., a corporation of Illinois No Drawing. Application September 3, 1953
Serial No. 378,425

3 Claims. (Cl. 260—45.5)

This invention relates to an organic adhesive adapted to adhere metals to one another and to be applied and cured at room temperatures and more particularly to such adhesive comprising acrylic resins.

The use of organic adhesives for bonding metal joints in aircraft construction instead of riveting or welding offers the advantages of lighter weight, smoother skin surfaces, and ease of application with less complicated equipment. The use of adhesives in place of rivets in securing together lightweight sheets of aluminum also has other advantages: Difficult assemblies, which are not possible with rivets, can be constructed; and perhaps most important, the fatigue strength of adhesively bonded joints is generally at least 2½ times as great as a comparable riveted joint between thin sheets of aluminum. It may readily be seen that for modern aircraft applications, such an improvement in fatigue strength of joints is of the utmost importance.

Adhesives based on phenolic resin-rubber blends have been successfully used in manufacturing operations but require heat and pressure during the process. An adhesive which provides a secure bond between metal sheets at room temperature, with only slight pressure such as may be provided by the weight of one sheet lying upon another, or by the use of hand clamps or sandbags or the like can speed up manufacturing immensely as well as making possible rapid repair work in the field where there is an absence of equipment adapted to provide heat and pressure.

A desirable adhesive, in addition to being adapted to provide a secure bond at room temperature, should also retain its strength at elevated temperatures and at extremely low temperatures. Furthermore it is desirable that the adhesive should have attained at least 75% of its ultimate strength within 24 hours after first being applied and that it should reach its ultimate strength in about 5 days at the most.

I have found that it is possible to provide a desirable adhesive of the type described by utilizing a solution of polymethyl methacrylate in a copolymerizable mixture of one or more of the lower esters of acrylic or methacrylic acid together with one or more unsaturated acids containing from 3 to 5 carbon atoms and containing one unsaturation, that is one double bond between carbon atoms.

It is therefore an object of this invention to provide an improved adhesive for bonding together sheets of metal.

Another object is an adhesive for bonding together sheets of such metals as aluminum which will provide a joint of great strength under only slight pressure at room temperature.

Another object is an adhesive for metals such as aluminum which comprises a copolymer of an acrylic ester and an unsaturated acid of low molecular weight.

Another object is an adhesively bonded joint of great strength between metal surfaces.

Further objects will become apparent from the following detailed description in which it is my intention to describe the invention and to illustrate the wide scope of its applicability.

This invention is an improvement in the adhesive disclosed and claimed in copending application Serial No. 326,787, filed December 18, 1952, now abandoned, by Johan Bjorksten, Risto P. Lappala and Luther L. Yaeger.

In accordance with a preferred embodiment of my invention I may first prepare a solution of about 4 to 10 parts of methylmethacrylate, about 1 part methacrylic acid and about 2 to 5 parts polymethyl methacrylate. This mixture is then applied directly to the cleaned surfaces of each of two plates of aluminum which I may desire to bond together, after adding one or more catalysts immediately prior to such application. The surfaces to which the adhesive has been applied are then laid in contact with one another and the assembly is allowed to stand at room temperature for 24 hours. After about 5 hours the assembly may be freely handled and after about 24 hours the joint is strong and rigid and has a strength of as much as 100% of the strength which it has after 5 days or 10 days.

The following examples illustrate the invention in greater detail.

*Example 1*

10 grams methacrylic acid inhibitor free
90 grams methyl methacrylate inhibitor free
30 grams polymethyl methacrylate molding granules (V–100 "Plexiglas," Rohm & Haas).

The above ingredients were heated at between 120° F. and 140° F. with an infra-red lamp with stirring until the polymethyl methacrylate was dissolved.

The mixture was then used as an adhesive for bonding together aluminum plates by adding to 24 grams of the adhesive, as catalysts, in sequence, 5 drops of diethyl aniline, 10 drops of ethyl methyl ketone peroxide sold commercially as Lupersol DDM and 3 drops of a solution of cobalt naphthenate containing 6% cobalt as metal, in a suitable solvent such as mineral spirits. The mixture thus prepared had a pot life of 30 minutes. The catalyzed mixture was used to bond together aluminum plates having a thickness of 0.064" in a lap joint ½ inch in width. A 1-inch wide strip cut from such an assembly, normal to the joint, was tested and it was found that the shear strength of the bond at room temperature was 4,400 pounds per square inch, at 180° F. it was 3,600 pounds per square inch, at 97° F. it was 3,900 pounds per square inch. Such a strip was also tested to determine its bond strength by fitting a tensile test machine with two knife edges adapted to pull downward 1½" apart and one knife edge adapted to pull upward spaced intermediate of the aforesaid two knife edges. The one-inch strip was placed in this device in such manner that the upwardly pulling knife edge bore against the joint itself and the strip failed at 170 pounds force.

*Example 2*

10 grams methacrylic acid (containing 0.1% hydroquinone as polymerization inhibitor)
90 grams methyl methacrylate, inhibitor free
25 grams polymethyl methacrylate molding granules (V-100 "Plexiglas," Rohm & Haas)

The ingredients were mixed and utilized as an adhesive in the manner described in connection with Example 1. A joint between a pair of aluminum plates bonded together with this adhesive exhibited properties comparable to those of the joint described in Example 1.

Example 3

10 grams methacrylic acid (containing 0.1% hydroquinone as polymerization inhibitor)
90 grams methyl methacrylate (containing 0.1% hydroquinone as polymerization inhibitor)
25 grams polymethyl methacrylate molding powder (V-100 "Plexiglas," Rohm & Haas)

The ingredients were mixed and utilized as an adhesive in the manner described in connection with Example 1. A joint between a pair of aluminum plates bonded together with this adhesive exhibited properties comparable to those of the joint described in Example 1.

Example 4

5 grams methacrylic acid (containing 0.1% hydroquinone as polymerization inhibitor)
5 grams acrylic acid (containing 0.1% hydroquinone as polymerization inhibitor)
90 grams methyl methacrylate (containing 0.1% hydroquinone as polymerization inhibitor)
25 grams polymethyl methacrylate molding powder (V-100 "Plexiglas," Rohm & Haas)

The ingredients were mixed and utilized as an adhesive in the manner described in connection with Example 1. A joint between a pair of aluminum plates bonded together with this adhesive exhibited properties only slightly lower than those of the joint described in Example 1.

Example 5

10 grams methacrylic acid (containing 0.1% hydroquinone as polymerization inhibitor)
5 grams acrylic acid (containing 0.1% hydroquinone as polymerization inhibitor)
80 grams polymethyl methacrylate (containing 0.1% hydroquinone as polymerization inhibitor)
30 grams polymethyl methacrylate molding granules (V-100 "Plexiglas," Rohm & Haas)

The ingredients were mixed and utilized as an adhesive in the manner described in connection with Example 1. A joint between a pair of aluminum plates bonded together with this adhesive exhibited properties only slightly less desirable than those of the joint described in Example 1.

Example 6

20 grams methacrylic acid (containing 0.1% hydroquinone as polymerization inhibitor)
80 grams methyl methacrylate (containing 0.1% hydroquinone as polymerization inhibitor)
35 grams polymethyl methacrylate molding granules (V-100 "Plexiglas," Rohm & Haas)

The ingredients were mixed and utilized as an adhesive in the manner described in connection with Example 1. A joint between a pair of aluminum plates bonded together with this adhesive exhibited properties of satisfactory magnitude but lower than those of the joint described in Example 1.

Example 7

5 grams methacrylic acid (containing 0.1% hydroquinone as polymerization inhibitor)
95 grams methyl methacrylate (containing 0.1% hydroquinone as polymerization inhibitor)
20 grams polymethyl methacrylate molding granules (V-100 "Plexiglas," Rohm & Haas)

The ingredients were mixed and utilized as an adhesive in the manner described in connection with Example 1. A joint between a pair of aluminum plates bonded together with this adhesive exhibited satisfactory strengths although lower than those of the joint described in Example 1.

Although the examples have shown the use of certain proportions of components from my adhesive and have shown certain compounds suitable for inclusion therein they do not indicate the full useful range, for example I may use from 5 to 20 parts of acid (methacrylic or acrylic acid or both), from 95 to 80 parts of methyl methacrylate, and from 10 to 30 parts of polymethyl methacrylate molding granules, each of the monomers may be free of inhibitors or may contain hydroquinone as a polymerization inhibitor in the amount of .3% to .006%.

This invention represents a significant improvement over the invention disclosed in co-pending application Serial No. 326,787 for the reason that the compositions described herein can be prepared far more economically due to the elimination of the heretofore critical pre-copolymerization step and also due to the elimination of the necessity for removing polymerization inhibitor from the monomers described in that application. According to the instant invention the adhesive composition may be prepared merely by the mixing of the ingredients and the application of moderate heat and stirring.

It will thus be apparent that the instant invention relates to an adhesive between metal surfaces and for use between metal surfaces comprising a mixture of a monomer having the formula:

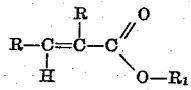

wherein R is —H or —CH$_3$ and R$_1$ is —C$_x$H$_{2x+1}$ and $x$ is 1 or 2, and a monomer having the formula:

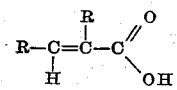

wherein R is —H or —CH$_3$, together with a polymer formed from a monomer having the first mentioned formula such as polymethyl methacrylate, wherein either of the above described monomers may contain a small amount of hydroquinone or other polymerization inhibitors. The instant invention also relates to a preferred simple economical method of preparing such adhesive.

Although the examples have shown only the use of polymethyl methacrylate as a polymer formed from a monomer having the first formula (being a polymer of a lower aliphatic ester of acrylic, methacrylic or crotonic acid), I have also used successfully other such esters including: polyethyl methacrylate, polymethyl acrylate, polyethyl acrylate, polybutyl methacrylate, polyisobutyl methacrylate, polybutyl acrylate and I may also suitably use other such esters including: polyethyl crotonate, polymethyl crotonate, polybutyl crotonate, polycyclohexyl acrylate, polycyclohexyl methacrylate, polyamyl acrylate, polyamyl methacrylate, polycyclohexyl crotonate, and the like.

It was found that when the concentration of the acid was greater than 20%, the formation of insoluble particles in the hottest areas of the reaction flask was excessive. It was also observed that the strengths of the bonds produced with adhesives comprising more than 20% of acid were undesirably low. It was found preferable to use a concentration of at least 5% of acid.

Generally it has been found necessary to provide a minimum period of about 15 minutes for catalytic copolymerization to take place in the joint before it may be handled without failure and, although longer periods are necessary in some cases, 3 hours has been found sufficient with some compositions to complete the polymerization sufficiently to obtain 75% of the ultimate strength in the joint. During this period of 3 hours or longer, the joint must not of course be subjected to forces sufficient to disturb the desired relation of the articles being adhered.

Having thus disclosed my invention, I claim:

1. A composition comprising 80 to 95 parts of at least one monomer selected from the group having the formula:

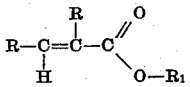

wherein R is a member from the group consisting of —H and —CH$_3$ and R$_1$ is C$_x$H$_{2x+1}$ and $x$ is a whole number not exceeding 2, 10 to 30 parts of at least one polymer formed from a monomer having said formula and 5 to 20 parts of at least one monomer selected from the group having the formula:

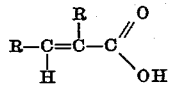

wherein R is a member from the group consisting of —H and —CH$_3$.

2. A composition comprising 80 to 95 parts of at least one monomer selected from the group having the formula:

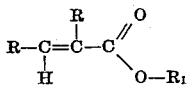

wherein R is a member from the group consisting of —H and —CH$_3$ and R$_1$ is C$_x$H$_{2x+1}$ and $x$ is a whole number not exceeding 2, 10 to 30 parts of at least one polymer formed from a monomer having said formula and 5 to 20 parts of at least one monomer selected from the group having the formula:

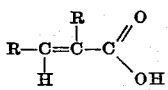

wherein R is a member from the group consisting of —H and —CH$_3$; wherein said monomers contain .3 to .006% polymerization inhibitor.

3. A composition comprising 80 to 95 parts of at least one monomer selected from the group having the formula:

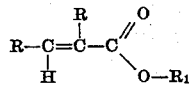

wherein R is a member from the group consisting of —H and —CH$_3$ and R$_1$ is C$_x$H$_{2x+1}$ and $x$ is a whole number not exceeding 2, 10 to 30 parts of at least one polymer formed from a monomer having said formula and 5 to 20 parts of at least one monomer selected from the group having the formula:

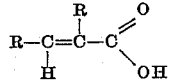

wherein R is a member from the group consisting of —H and —CH$_3$; wherein said monomers contain .3 to .006% hydroquinone.

References Cited in the file of this patent

UNITED STATES PATENTS

| | | |
|---|---|---|
| 2,104,760 | Renfrew | Jan. 11, 1938 |
| 2,273,891 | Pollack et al. | Feb. 24, 1942 |
| 2,373,488 | Marks | Apr. 10, 1945 |
| 2,464,826 | Neher et al. | Mar. 22, 1949 |

OTHER REFERENCES

"Monomers," by Blout et al., "Methyl Methacrylate," pages 8 and 9, published by Interscience Publishers, Inc., New York, N. Y., copyright 1949.